US009852348B2

(12) United States Patent
Chaudhury et al.

(10) Patent No.: US 9,852,348 B2
(45) Date of Patent: Dec. 26, 2017

(54) DOCUMENT SCANNER

(71) Applicant: Google Inc., Mountain View, CA (US)

(72) Inventors: Krishnendu Chaudhury, Saratoga, CA (US); Lu Chen, Chapel Hill, NC (US); David Petrou, Brooklyn, NY (US); Blaise Aguera-Arcas, Seattle, WA (US)

(73) Assignee: Google LLC, Mountain View, CA (US)

( * ) Notice: Subject to any disclaimer, the term of this patent is extended or adjusted under 35 U.S.C. 154(b) by 237 days.

(21) Appl. No.: 14/690,274

(22) Filed: Apr. 17, 2015

(65) Prior Publication Data

US 2016/0307059 A1 Oct. 20, 2016

(51) Int. Cl.
*G06K 9/18* (2006.01)
*G06K 9/00* (2006.01)
*G06K 9/32* (2006.01)
*G06K 9/34* (2006.01)
*G06K 9/46* (2006.01)
*G06K 9/62* (2006.01)
(Continued)

(52) U.S. Cl.
CPC ........... *G06K 9/18* (2013.01); *G06K 9/00463* (2013.01); *G06K 9/00483* (2013.01); *G06K 9/3275* (2013.01); *G06K 9/342* (2013.01); *G06K 9/4642* (2013.01); *G06K 9/6211* (2013.01); *G06T 3/4038* (2013.01); *G06T 11/60* (2013.01); *G06K 2009/363* (2013.01)

(58) Field of Classification Search
CPC .. G06K 9/18; G06K 9/00463; G06K 9/00483; G06K 9/3275; G06K 9/342; G06K 9/6211; G06K 9/4642; G06K 2009/363; G06T 11/60; G06T 3/4038
See application file for complete search history.

(56) References Cited

U.S. PATENT DOCUMENTS 6,075,905 A * 6/2000 Herman ............... G06K 9/32
348/588
6,157,747 A * 12/2000 Szeliski ............. G06K 9/209
345/419

(Continued)

OTHER PUBLICATIONS

International Search Report and Written Opinion in International Application No. PCT/US2016/025042, dated Aug. 10, 2016, 20 pages.

(Continued)

*Primary Examiner* — Samir Ahmed
(74) *Attorney, Agent, or Firm* — Fish & Richardson P.C.

(57) ABSTRACT

Methods, systems, and apparatus, including computer programs encoded on a computer storage medium, to generate a scannable document. In one aspect, a method includes receiving a scan request, wherein the scan request includes a plurality of text images; for each text image of the plurality of text images: rectifying the text image to generate a text image with parallel image lines, generating a plurality of word bounding boxes that enclose one or more connected components in the text image, wherein each word bounding box is associated with a respective word, and generating, for each respective word in the text image, a plurality of points that represent the respective word; combining the plurality of text images to form a single text document; and providing the combined image as a scannable document.

22 Claims, 4 Drawing Sheets

(51) Int. Cl.
*G06T 3/40* (2006.01)
*G06T 11/60* (2006.01)
*G06K 9/36* (2006.01)

(56) References Cited

U.S. PATENT DOCUMENTS

| | | | | |
|---|---|---|---|---|
| 6,208,347 | B1* | 3/2001 | Migdal | G06T 17/20 345/419 |
| 7,120,314 | B2* | 10/2006 | Schweid | H04N 1/3878 358/488 |
| 7,171,046 | B2* | 1/2007 | Myers | G06K 9/3258 382/187 |
| 7,245,765 | B2* | 7/2007 | Myers | G06K 9/228 382/181 |
| 7,403,656 | B2* | 7/2008 | Koga | G06K 9/3258 382/177 |
| 7,580,571 | B2* | 8/2009 | Ohguro | G06K 9/3208 382/181 |
| 7,903,875 | B2* | 3/2011 | Fujita | G06K 9/2054 382/175 |
| 7,930,627 | B2* | 4/2011 | Ming | G06F 17/2211 715/200 |
| 8,023,725 | B2* | 9/2011 | Schwartzberg | G06K 9/3258 345/633 |
| 2002/0051575 | A1* | 5/2002 | Myers | G06K 9/3258 382/202 |
| 2005/0180632 | A1* | 8/2005 | Aradhye | G06K 9/3283 382/182 |
| 2007/0031062 | A1* | 2/2007 | Pal | G06F 17/30843 382/284 |
| 2007/0110338 | A1* | 5/2007 | Snavely | G06F 17/30274 382/305 |
| 2010/0040287 | A1* | 2/2010 | Jain | G06K 9/00463 382/177 |
| 2013/0188886 | A1* | 7/2013 | Petrou | G06F 3/048 382/305 |
| 2014/0002488 | A1* | 1/2014 | Summa | G06T 3/4038 345/629 |

OTHER PUBLICATIONS

Kasar et al., "CCD: Connected Component Descriptor for Robust Mosaicing of Camera-Captured Document Images," Document Analysis Systems, 2008. DAS '08, The Eighth IAPR International Workshop on, IEEE, Sep. 16, 2008, pp. 480-486, XP031360515.

Liang et al., "Camera-Based Document Image Mosaicing," International Conference on Pattern Recognition, Aug. 2006, pp. 476-479, XP055275002.

Ligang et al., "Automatic document image mosaicing algorithm with hand-held camera," Intelligent Control and Information Processing (ICICIP), 2011 $2^{nd}$ International Conference on, IEEE, Jul. 25, 2011, pp. 1094-1097, XP031933918.

'Wikipedia' [online]. "Homography," Apr. 16, 2015 [retrieved on Apr. 16, 2015]. Retrieved from the Internet: URL<http://en.wikipedia.org/wiki/Homography>, 8 pages.

'Wikipedia' [online]. "Image stitching," Feb. 25, 2015 [retrieved on Apr. 16, 2015]. Retrieved from the Internet: URL<http://en.wikipedia.org/wiki/Image_stitching>, 5 pages.

Pollefeys, "Relation between projection matrices and image homographies," Nov. 22, 2002 [retrieved on Apr. 16, 2015]. Retrieved from the Internet: URL<http://www.cs.unc.edu/~marc/tutorial/node40.html>, 3 pages.

* cited by examiner

DOCUMENT SCANNER

BACKGROUND

This specification relates to image processing.

Conventional panorama stitching is a technique for combining multiple photographic images with overlapping fields of view to produce a segmented panorama or high-resolution image. For example, high-resolution mosaics of satellite images and digital maps use panoramic stitching. Other conventional applications, for example, medical imaging and image stabilization, also apply panoramic stitching techniques. Capturing images of different orientations, angles, perspectives, and depth typically distort the final stitched image.

SUMMARY

In general, one aspect of the subject matter described in this document can be embodied in a technique that includes receiving a scan request, wherein the scan request includes a plurality of text images, each text image representing a portion of a text document, wherein the plurality of text images includes a first text image and a second text image that at least partially overlap; for each text image of the plurality of text images: rectifying the text image to generate a text image with parallel image lines, generating a plurality of word bounding boxes that enclose one or more connected components in the text image, wherein each word bounding box is associated with a respective word, and generating, for each respective word in the text image, a plurality of points that represent the respective word; combining the plurality of text images to form a single text document including combining the first text image of the plurality of text images and the second text image of the plurality of text images by matching a first set of points associated with the first text image and a second set of points associated with the second text image; and providing the combined image as a scannable document.

Other embodiments of this aspect include corresponding systems, apparatus, and computer programs encoded on computer storage devices, each configured to perform the actions of the methods. A system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

The subject matter described in this specification can be implemented in particular embodiments so as to realize one or more of the following advantages. The user may take multiple images of at least a portion of a document at different angles, orientations, perspectives, or distances to generate an overall scannable image of a document without sacrificing resolution and without having to perfectly align the camera with the document. The user may aim and sweep the camera without undue restriction on depth or orientation over a planar surface containing text, e.g., a magazine, newspaper page, or poster, to capture an image of the document. The user may capture the images at random or in a predetermined pattern. Furthermore, multiple users or devices can contribute to the multiple images used to form the scannable document.

The details of one or more embodiments of the subject matter described in this document are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
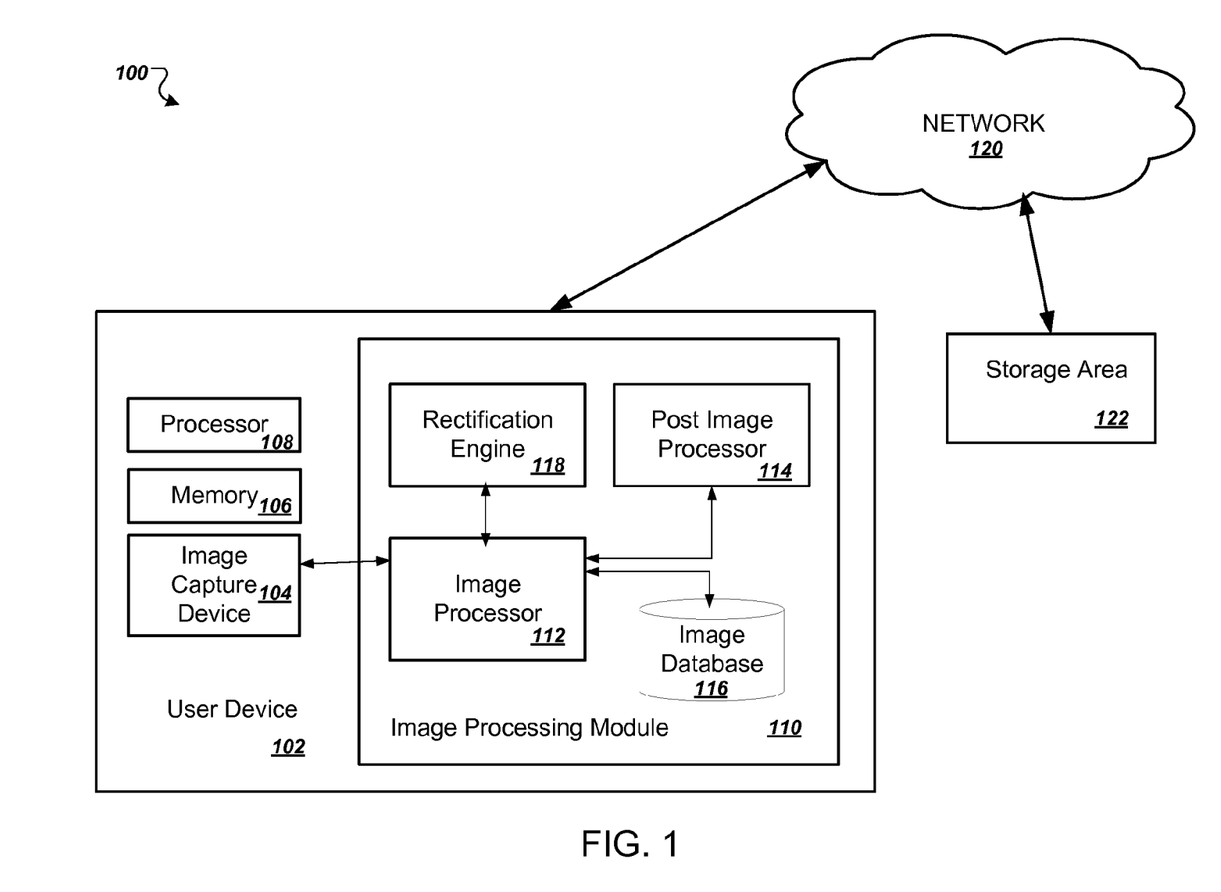
FIG. 1 shows an example image processing system.

FIG. 1 shows an example image processing system 100. The image processing system 100 is an example of a system implemented as one or more computer programs on one or more computers in one or more locations, in which the systems, components, and techniques described below, are implemented.

The image processing system 100 includes an image processing module 110 on a user device 102, e.g., a smartphone, a tablet, or a smartwatch, that processes scan requests, from a user, to generate scannable documents from multiple images. A scannable document is a high-resolution image of a text document in which the system can perform optical character recognition (OCR) or other suitable methods of character recognition to recognize the text of the document. A text document is any planar surface that contains text.

A user interacts with the image processing module 110 through a user device 102. The image processing module 110 may electronically store documents remotely in a storage area 122, e.g. across a data communication network 120. The data communication network 120, e.g., a local area network (LAN) or wide area network (WAN), e.g., the Internet, or a combination of networks, couples the image processing module 110 with the storage area 122. The image processing module 110 and user device 102 are one machine. For example, a user installs an application that performs the image processing on the user device.

The user device 102 includes an image capture device 104, e.g., a camera, a memory 106, and a processor 108. The image capture device 104 does not need to capture the entire planar surface of the text document in a single image to create the scannable document. For example, the user may sweep the image capture device 104 across the entire planar surface and capture the planar surface in multiple images.

The image processing module 110 includes an image processor 112 that receives a scan request from a user. As used in this specification, a scan request is a request to process one or more images of a text document into a scannable document. The scan request may be a request to generate a scannable document of a page of a magazine or a page of a book from multiple images. Another example of a scan request is a request to generate a scannable document from a signboard or poster. Another example of a scan request may be to generate a scannable document from text on any planar surface. The image processing module 110 processes the scan request by piecing together different images of the text document. In some implementations, an image is a binarized image.

The scan request includes images of at least a portion of the text document to form the scannable document. The image processor 112 may receive multiple images of multiple portions of one or more text documents. Each image of a portion of a text document includes a text portion. Each image also includes a text portion that overlaps with another text portion in another image of the multiple images of the text documents. The image processor 112 may store received images in an image database 116.

The image processor 112 identifies one or more text images in the scan request that, when rectified and mosaiced, create a scannable document. As used in this specification, a rectified image is a text image that has parallel horizontal text lines and parallel vertical skeletal lines. In some implementations, the image processor 112 uses stored images from the image database 116 and images received from the image capture device 104 to form the scannable document. In other implementations, the image processor 112 uses only stored images from the image database or only images received from the image capture device 104 to form the scannable document.

The image processor 112 also performs the mosaicing of multiple images to form a unified fronto-parallel view. Document image mosaicing refers to the process of creating a unified fronto-parallel view from a sequence of overlapping images. Mosaicing is based on an estimation of a homography between two overlapping views. The portion of the text document that two different images have in common is an overlapping view. The image processor identifies overlapping views by matching points in the two different views. Points characterize the shape of words in a text image. The image processor 112 stitches together the overlapping views using the matched points to form the unified fronto-parallel view. Stitching is the process of combining multiple images with overlapping fields of view to produce a combined image, for example, a segmented panorama or a high-resolution image.

The image processing module 110 also includes a rectification engine 118 that rectifies each text containing image. Specifically, the rectification engine 118 performs a transformation process that projects each text containing image with different perspectives, depths, and orientation onto a common plane with a unified fronto-parallel view. The rectification engine 118 uses a geometric formula to transform each image to the fronto-parallel view making image lines in the image parallel. The image lines include horizontal and vertical linelets. Horizontal and vertical linelets that form regression lines that are not parallel indicate that there is distortion in an image. A horizontal linelet is small line segment aligned with a text line. A vertical linelet is a skeletal line through an upright portion of a letter. The rectification engine 118 performs operations to remove the distortion from the image. Once completed, the rectification engine 118 provides the image to the image processor 112 for further processing.

The image processing module 110 includes a post image processor 114. The post image processor 114 performs blending, de-skewing, and optical character recognition of the unified fronto-parallel view of a document after the image processor stitches together the multiple rectified images. Blending is the process of smoothing images into each other to create a seamless gradation from one image to another so that the separate images are not distinguishable. De-skewing is the process of straightening of an image that is slanted in one direction or is misaligned. The post image processor 114 applies a rotation on the single view of the document to align the text lines with an image X-axis along with the de-skewing. Optical character recognition is the conversion of images of text into machine-encoded text.

Figure 2:
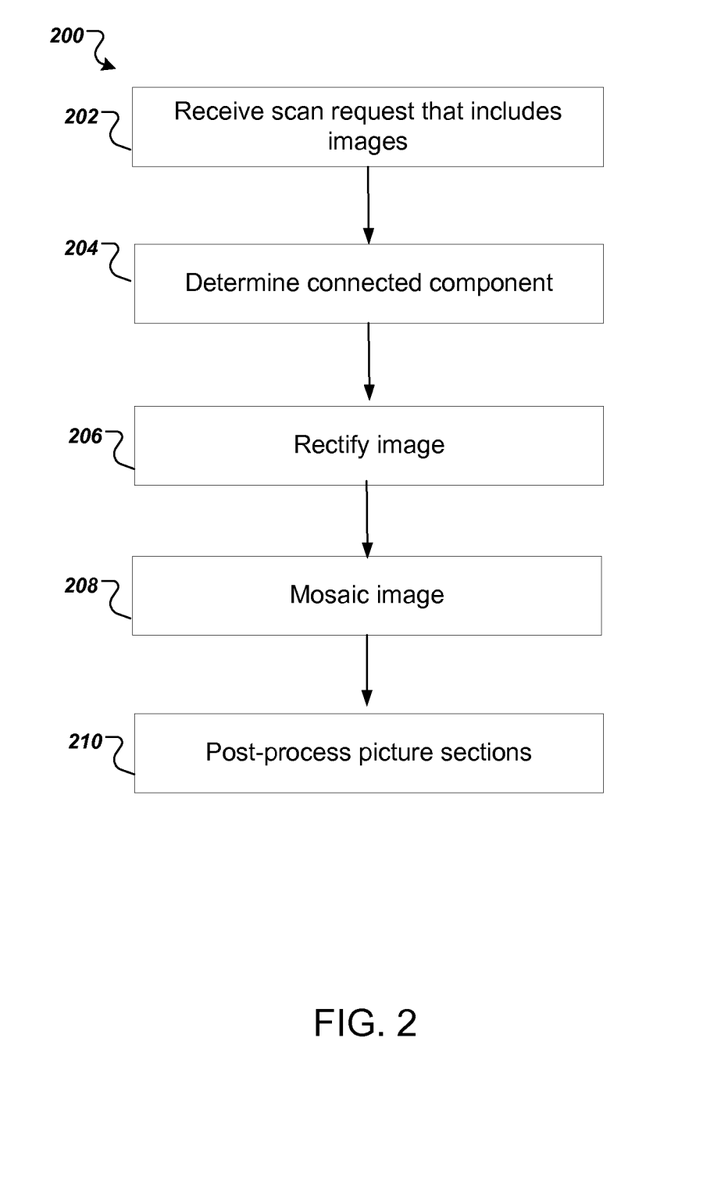
FIG. 2 is a flow diagram of an example process for generating a scannable document.

FIG. 2 is a flow diagram of an example process 200 for generating a scannable document. The process 200 is performed by a system of one or more computers. For example, an image processing system, e.g., the image processing system 100 of FIG. 1, appropriately programmed, can perform the process 200.

The system receives a scan request that includes text images (step 202). The scan request is a request create a scannable document from multiple text images. Each text image is a representation of a section of a particular document that has a text portion that overlaps with a text portion in a section represented by another text image of the multiple text images. In some implementations, a section is a portion of a particular document. The text images, when collectively stitched together, form an image of a document that is scannable. In other implementations, a section is the entire document.

The system determines connected components in each text image (204). A connected component is a character within the text. In a text image, connected components are separated by whitespace. For example, in the word "company," each symbol 'c', 'o', 'm', 'p', 'a', 'n', 'y' is a connected component. The system determines each connected component based on the whitespace and filled portion of the symbols.

The system rectifies each text image using the connected components (step 206). Text lines through connected components are parallel if there is no distortion in the image. A text line is a line drawn through the center of the connected components. If the text lines are not parallel then the image has distortion and the system performs rectification to transform the image so that the text lines through the connected components are parallel. The system uses the connected components to form nearest neighbor chains. Nearest neighbor chain (NNC) refers to maximal length chains of adjacent connected components with approximately the same y-extents.

The system generates linelets and vanishing points using least square regression lines of the connected components to perform rectification. The system generates both horizontal linelets or "H-linelets" and vertical linelets or "V-linelets." Linelets are characterized by a location, i.e., an orthogonal projection of the centroid of the points forming a regression line, and a direction, i.e. unit vector along the regression line. A vanishing point is a single point on the text image where all corresponding linelets intersect. The process for performing rectification of an image is described in more detail below with reference to FIG. 3.

The system mosaics the rectified image (step 208). The system identifies corresponding points between different views of at least a portion of the document to perform mosaicing. The system computes a histogram oriented gradient (HOG) vector over words in the portions of text image to describe word shape features in the text images. The system uses these vectors to identify corresponding points between two text images that the system matches to stitch together the two overlapping text images. The process for performing mosaicing is described in more detail below with reference to FIG. 4.

The system performs post-processing on the mosaiced image to form the scannable document (step 210). Post-processing includes blending, de-skewing, and optical character recognition of the images. The system may display on the user device the post-processed image of the single unified scannable document. In some other implementations, the system stores the scannable document or sends the scannable document over the network to a storage area.

Figure 3:
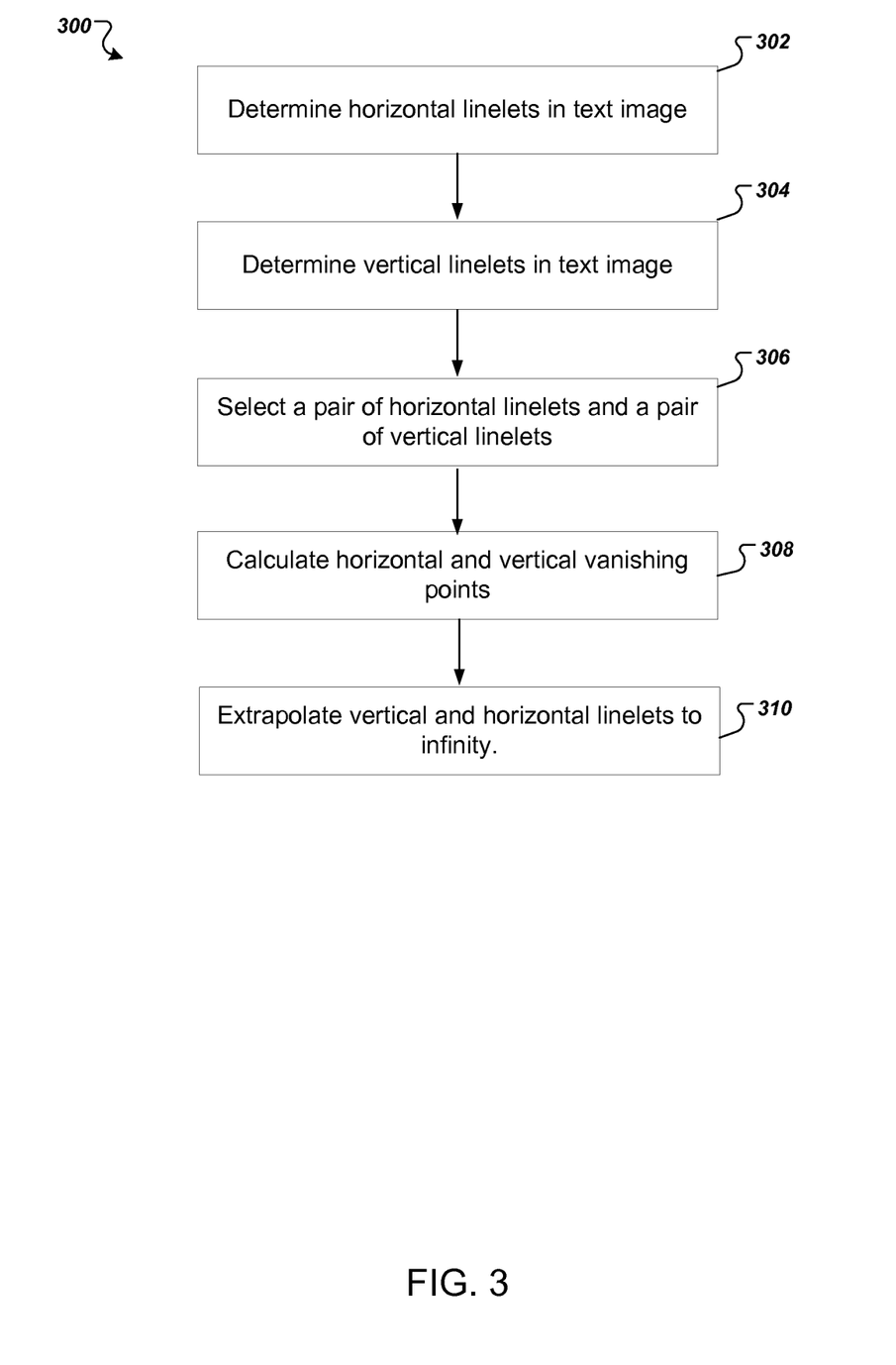
FIG. 3 is a flow diagram of an example process for performing rectification of an image.

FIG. 3 is a flow diagram of an example process 300 for performing rectification of an image. The process 300 is performed by a system of one or more computers. For example, an image processing system, e.g., the image processing system 100 of FIG. 1, appropriately programmed, can perform the process 300.

The system determines horizontal linelets in each text image (step 302). A horizontal inelet, or "H-linelet" is a small line segment aligned with a text line. To determine horizontal linelets, the system forms nearest neighbor chains (NNC's) to estimate the text lines.

An NNC refers to the maximal length of chains of adjacent connected components with approximately the same y-extents. A connected component may include an ascender or a descender. An ascender is a portion of the connected component that lies above the text line. For example, in the word "cart" the symbol 't' has an ascender. A descender is a portion of the connected component that lies below the text line. For example, in the word "company", the symbol 'p' has a descender.

A text line is a line drawn through the center of the connected components. The centroids of the connected components that make up an NNC coincide with a text line. The system generates a least squares regression line through the center of the connected components of each NNC. The least squares regression line does not lie exactly at the mean or median of the connected components of the NNC because descenders pull the regression line downwards and ascenders pull the regression line upwards. The system does not consider connected components that have a centroid that is beyond a threshold difference of adjacent connected components. A least square regression line through the remaining centroids of the connected components in an NNC generates a horizontal linelet or "H-linelet."

The system determines vertical linelets in each text image (step 304). A vertical linelet is a skeletal line through an upright portion of a connected component. For example, the symbols 'I', 'F', 'p', and 'L' have an upright portion that forms the vertical linelet or "V-linelet. The system determines a V-linelet by identifying the curvature of segments that correspond to the upright strokes of each symbol. The system skeletonizes each connected component on the text image to identify the curvature of segments. The system estimates the maximum curvature on the curve segments and eliminates curves that exceed a threshold to determine the linear upright segments. A regression line through the remaining points, if any, yield the V-linelet.

The system selects a pair of H-linelets and a pair of V-linelets (step 306). In some implementations, the system randomly selects the linelets. In some other implementations, the linelet selection is not completely random. For example, the system can perform a descending sort of the set of linelets based on line segment length and select the first linelet randomly from the top 20 percentile of the set of linelets and the second linelet from the top 50 percentile. The system uses the pair of H-linelets to determine the horizontal vanishing point and the pair of V-linelets to determine the vertical vanishing point.

The system calculates the horizontal and vertical vanishing points using the selected linelets (step 308). The horizontal vanishing point is the point where all H-linelets meet or intersect when the system extrapolates or extends the H-linelets to infinity. A vertical vanishing point is the point where all V-linelets meet or intersect when the system extrapolates or extends the V-linelets to infinity. The vanishing point is a function of the pair of linelet vectors. The corresponding vanishing point is the point of intersection of the two linelets, $\vec{v}_m = \vec{1}_1 \times \vec{1}_2$, where $\vec{v}_m$ is the vanishing point, $\vec{1}_1$ is a linelet in a set of linelets, $\vec{1}_2$ is a different linelet in the same set of linelets, and 'x' denotes the vector cross-product. For example, the system may use a model, e.g., a Random Sample Consensus (RANSAC) Model, to determine the vanishing point. The system may also re-estimate the vanishing points using a weighted least squares regression.

The system extrapolates the V-linelets and H-linelets to infinity by performing homography to restore parallel lines in the text image (step 310). The system applies a geometric formula to the pair of vanishing points and transforms the vanishing points back to infinity. That is, the homography effectively warps the image to restore parallelism of lines in the text image. The system calculates the homography as follows:

Let, $\vec{v}_1$ and $\vec{v}_2$ be a pair of vanishing points. The line joining the vanishing points is $\vec{1}_{12} = \vec{v}_1 \times \vec{v}_2$. Then, $$H = \begin{bmatrix} 1 & 0 & 0 \\ 0 & 1 & 0 \\ l_a & l_b & l_c \end{bmatrix}$$

is the rectification homography, and $\vec{1}_{12} = [l_a \ l_b \ l_c]^T$. The system transforms the vanishing points back into infinity since, $$H\vec{v}_1 = \begin{bmatrix} \cdots & \cdots & \cdots \\ \cdots & \cdots & \cdots \\ \vec{l}_{12} & \cdots & \vec{v}_1 \end{bmatrix} = \begin{bmatrix} \cdots \\ \cdots \\ 0 \end{bmatrix}.$$

The system applies the rectification homography to each text image to restore the parallelism in each text image. The system performs mosaicing on the rectified images to create the unified view.

Figure 4:
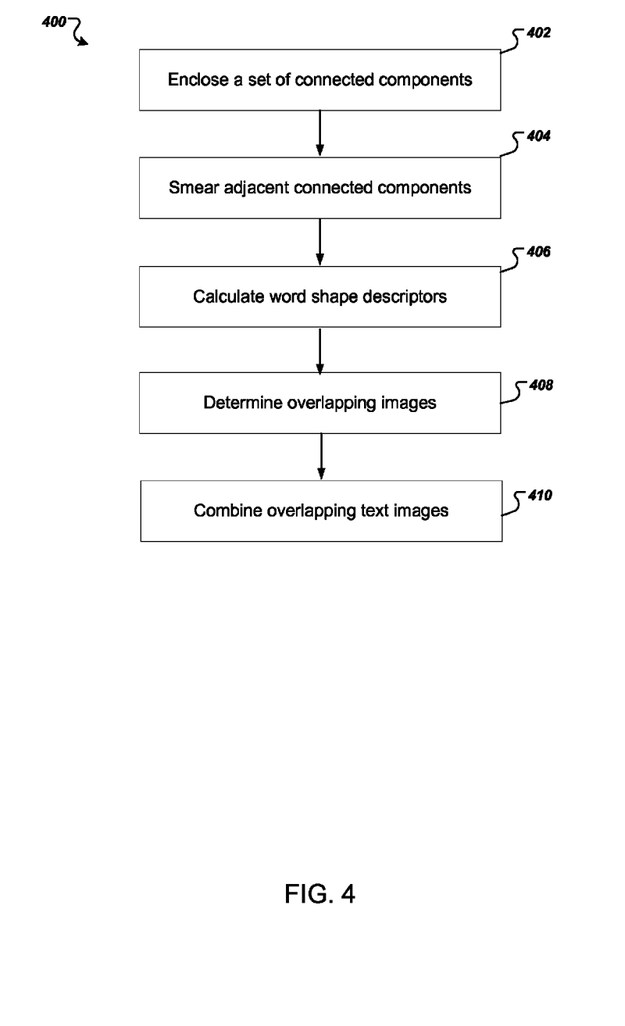
FIG. 4 is a flow diagram of an example process for performing mosaicing.

FIG. 4 is a flow diagram of an example process 400 for performing mosaicing. The process 400 is performed by a system of one or more computers. For example, an image processing system, e.g., the image processing system 100 of FIG. 1, appropriately programmed, can perform the process 400.

The system creates a rectangular structural object that encloses a set of connected components (step 402). The size of the rectangular structural object depends on the font size of the text. The system determines the size of the rectangular structural object based on a function of the mean width and height of connected components. For example, if the font size is 30 pt. the mean width and height of connected components is greater than the mean width and height of the connected components when the font size is 2 pt. The size of the rectangular structural object adjusts based on the font size so the size of the rectangular structural object for connected components with a larger font size is greater than the size of the rectangular structural object when the font size is smaller.

The system smears the adjacent connected components to create word-bounding boxes (step 404). A set of connected components represent a word in the text image. Each connected component that forms the word is a character, e.g., a letter, and each character is adjacent to another character in the set of connected components.

Connected components that are adjacent and form the set of connected components that represent a word in the text image have less whitespace between each connected component. The whitespace between each connected component is less than a threshold amount. The threshold amount is less than the spacing between words in the text image but at least equal to the amount of spacing between adjacent characters. The threshold amount of whitespace represents the amount of whitespace between words. The system smears connected components that are less than a threshold amount apart.

The system calculates word shape descriptors on the word bounding boxes (step 406). The system tiles the word-bounding box into a fixed grid of cells and performs histogram oriented gradient (HoG) over the word-bounding box. That is, the system describes the shape of the words in the text image using a vector. In some implementations, the system uses a 4×4 grid of HoG cells, with 9 angular bins per cell, leading to 144 word shape descriptors.

The system determines the overlapping text images by matching the points in one text image with points in another text image (step 408). Points refer to word shape descriptors in an image. In some implementations, a threshold amount of points need to match for the system to match one text image with another text image. For example, the system may require that at least 4 word shape descriptors or points need to match for the system to match one text image with another text image. The system performs the matching on all the text images to find the overlapping text images. The system combines the overlapping text images to form the scannable document using the matched points (step 410).

Embodiments of the subject matter and the operations described in this document can be implemented in digital electronic circuitry, or in computer software, firmware, or hardware, including the structures disclosed in this document and their structural equivalents, or in combinations of one or more of them. Embodiments of the subject matter described in this document can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this document can be implemented as operations performed by a data processing apparatus on data stored on one or more computer-readable storage devices or received from other sources. The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this document can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this document can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this document, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this document contains many specific implementation details, these should not be construed as limitations on the scope of any inventions or of what may be claimed, but rather as descriptions of features specific to particular embodiments of particular inventions. Certain features that are described in this document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer implemented method, the method comprising:
    receiving a scan request, wherein the scan request includes a plurality of text images, each text image representing a portion of a text document, wherein the plurality of text images includes a first text image and a second text image that at least partially overlap;
    for each text image of the plurality of text images:
        rectifying the text image to generate a text image with parallel image lines,
        generating a plurality of word bounding boxes that enclose one or more connected components in the text image, wherein each word bounding box is associated with a respective word of the text image, and
        generating, for each respective word bounding box in the text image, a vector that describes a shape of the respective word;
    combining text images of the plurality of text images that at least partially overlap to form a single text document including combining the first text image of the plurality of text images and the second text image of the plurality of text images by matching one or more shape descriptors from a first set of vectors generated for each respective word in the first text image and one or more shape descriptors from a second set of vectors generated for each respective word in the second text image; and
    providing the combined image as a scannable document.

2. The method of claim 1, wherein rectifying each text image of the plurality of text images comprises:
    determining a plurality of connected components in the text image, each connected component being a filled portion of a symbol;
    generating a plurality of image lines in the text image including vertical linelets and horizontal linelets based on the plurality of connected components;
    calculating a horizontal vanishing point and a vertical vanishing point based on the plurality of image lines; and
    applying a geometric formula to the first and second vanishing points to restore parallel lines in the text image.

3. The method of claim 2, wherein the plurality of image lines includes a plurality of vertical linelets and a plurality of horizontal linelets, each vertical linelet being a skeletal line through an upright portion of a connected component, each horizontal linelet being a regression line through a center of a set of adjacent connected components.

4. The method of claim 3, wherein calculating a horizontal vanishing point and a vertical vanishing point based on the plurality of image lines further comprises:
  calculating the horizontal vanishing point using the horizontal linelets; and
  calculating the vertical vanishing point using the vertical linelets.

5. The method of claim 1, wherein combining the first text image and the second text image includes blending the first text image with the second text image.

6. The method of claim 1, wherein a number of matching shape descriptors between the first set of vectors associated with the first text image and the second set of vectors associated with the second text image satisfies a threshold number of matching shape descriptors.

7. The method of claim 1, wherein combining the plurality of text images further comprises:
  blending the plurality of text images that form the single text document;
  de-skewing the single text document; and
  performing optical character recognition on the single text document.

8. A system, comprising:
one or more computers;
one or more storage devices storing instructions that, when executed by the one or more computers, cause the one or more computers to perform operations comprising:
  receiving a scan request, wherein the scan request includes a plurality of text images, each text image representing a portion of a text document, wherein the plurality of text images includes a first text image and a second text image that at least partially overlap;
  for each text image of the plurality of text images:
    rectifying the text image to generate a text image with parallel image lines,
    generating a plurality of word bounding boxes that enclose one or more connected components in the text image, wherein each word bounding box is associated with a respective word of the text image, and
  generating, for each respective word bounding box in the text image, a vector that describes a shape of the respective word;
  combining text images of the plurality of text images that at least partially overlap to form a single text document including combining the first text image of the plurality of text images and the second text image of the plurality of text images by matching one or more shape descriptors from a first set of vectors generated for each respective word in the first text image and one or more shape descriptors from a second set of vectors generated for each respective word in the second text image; and
  providing the combined image as a scannable document.

9. The system of claim 8, wherein rectifying each text image of the plurality of text images comprises:
  determining a plurality of connected components in the text image, each connected component being a filled portion of a symbol;
  generating a plurality of image lines in the text image including vertical linelets and horizontal linelets based on the plurality of connected components;
  calculating a horizontal vanishing point and a vertical vanishing point based on the plurality of image lines; and
  applying a geometric formula to the first and second vanishing points to restore parallel lines in the text image.

10. The system of claim 9, wherein the plurality of image lines includes a plurality of vertical linelets and a plurality of horizontal linelets, each vertical linelet being a skeletal line through an upright portion of a connected component, each horizontal linelet being a regression line through a center of a set of adjacent connected components.

11. The system of claim 10, wherein calculating a horizontal vanishing point and a vertical vanishing point based on the plurality of image lines further comprises:
  calculating the horizontal vanishing point using the horizontal linelets; and
  calculating the vertical vanishing point using the vertical linelets.

12. The system of claim 8, wherein combining the first text image and the second text image includes blending the first text image with the second text image.

13. The method of claim 8, wherein a number of matching shape descriptors between the first set of vectors associated with the first text image and the second set of vectors associated with the second text image satisfies a threshold number of matching shape descriptors.

14. The system of claim 8, wherein combining the plurality of text images further comprises:
  blending the plurality of text images that form the single text document;
  de-skewing the single text document; and
  performing optical character recognition on the single text document.

15. A computer storage medium encoded with a computer program, the program comprising instructions that when executed by one or more computers cause the one or more computers to perform operations comprising:
  receiving a scan request, wherein the scan request includes a plurality of text images, each text image representing a portion of a text document, wherein the plurality of text images includes a first text image and a second text image that at least partially overlap;
  for each text image of the plurality of text images:
    rectifying the text image to generate a text image with parallel image lines,
    generating a plurality of word bounding boxes that enclose one or more connected components in the text image, wherein each word bounding box is associated with a respective word of the text image, and
    generating, for each respective word bounding box in the text image, a vector that describes a shape of the respective word;
  combining text images of the plurality of text images that at least partially overlap to form a single text document including combining the first text image of the plurality of text images and the second text image of the plurality of text images by matching one or more shape descriptors from a first set of vectors generated for each respective word in the first text image and one or more shape descriptors from a second set of vectors generated for each respective word in the second text image; and
  providing the combined image as a scannable document.

16. The computer storage medium of claim 15, wherein rectifying each text image of the plurality of text images comprises:
- determining a plurality of connected components in the text image, each connected component being a filled portion of a symbol;
- generating a plurality of image lines in the text image including vertical linelets and horizontal linelets based on the plurality of connected components;
- calculating a horizontal vanishing point and a vertical vanishing point based on the plurality of image lines; and
- applying a geometric formula to the first and second vanishing points to restore parallel lines in the text image.

17. The computer storage medium of claim 16, wherein the plurality of image lines includes a plurality of vertical linelets and a plurality of horizontal linelets, each vertical linelet being a skeletal line through an upright portion of a connected component, each horizontal linelet being a regression line through a center of a set of adjacent connected components.

18. The computer storage medium of claim 17, wherein calculating a horizontal vanishing point and a vertical vanishing point based on the plurality of image lines further comprises:
- calculating the horizontal vanishing point using the horizontal linelets; and
- calculating the vertical vanishing point using the vertical linelets.

19. The computer storage medium of claim 15, wherein combining the first text image and the second text image includes blending the first text image with the second text image.

20. The method of claim 15, wherein a number of matching shape descriptors between the first set of vectors associated with the first text image and the second set of vectors associated with the second text image satisfies a threshold number of matching shape descriptors.

21. The computer storage medium of claim 15, wherein combining the plurality of text images further comprises:
- blending the plurality of text images that form the single text document;
- de-skewing the single text document; and
- performing optical character recognition on the single text document.

22. The method of claim 1, wherein generating a particular vector for a particular word includes generating a grid for the corresponding word bounding box, performing histogram oriented gradient over the cells of the grid to determine word shape descriptors, and generating the particular vector from the words shape descriptors.

* * * * *